United States Patent
Silva et al.

(10) Patent No.: US 9,021,092 B2
(45) Date of Patent: Apr. 28, 2015

(54) NETWORK INFRASTRUCTURE OBFUSCATION

(71) Applicant: ZanttZ,Inc., Portola Valley, CA (US)

(72) Inventors: Steven M. Silva, Kennewick, WA (US);
Yadong Zhang, Sunnyvale, CA (US);
Eric Winsborrow, West Vancouver (CA); Johnson L. Wu, Sunnyvale, CA (US); Craig A. Schultz, Danville, CA (US)

(73) Assignee: Shadow Networks, Inc., Santa Clara, CA (US)

( * ) Notice: Subject to any disclaimer, the term of this patent is extended or adjusted under 35 U.S.C. 154(b) by 0 days.

(21) Appl. No.: 14/058,034

(22) Filed: Oct. 18, 2013

(65) Prior Publication Data

US 2014/0115706 A1    Apr. 24, 2014

Related U.S. Application Data

(60) Provisional application No. 61/716,407, filed on Oct. 19, 2012.

(51) Int. Cl.
*G06F 15/173*    (2006.01)
*H04L 29/06*    (2006.01)
*H04L 12/24*    (2006.01)

(52) U.S. Cl.
CPC ............ *H04L 63/1491* (2013.01); *H04L 41/12* (2013.01); *H04L 63/0209* (2013.01); *H04L 63/1425* (2013.01)

(58) Field of Classification Search
CPC ............ H04L 63/1491; H04L 63/0209; H04L 63/1425; H04L 9/002; G06F 21/50; G06F 17/00
USPC .......................................... 709/223, 224, 225
See application file for complete search history.

(56) References Cited

U.S. PATENT DOCUMENTS 7,107,347 B1 *    9/2006    Cohen ........................... 709/229
7,552,480 B1    6/2009    Voss (Continued)

FOREIGN PATENT DOCUMENTS

JP    2000-252987    9/2000

OTHER PUBLICATIONS

Magalhaes, "Understanding Virtual Honeynets," WindowSecurity.com, retrieved on Dec. 19, 2013, 4 pages, http://www.windowsecurity.com/articles-tutorials/intrusion_detection/understanding_vir . . . .

(Continued)

*Primary Examiner* — Lynn Feild
*Assistant Examiner* — Jonathan Bui
(74) *Attorney, Agent, or Firm* — Kilpatrick Townsend & Stockton LLP

(57) ABSTRACT

A shadow network, which can be a virtual reproduction of a real, physical, base computer network, is described. Shadow networks duplicate the topology, services, host, and network traffic of the base network using shadow hosts, which are low interaction, minimal-resource-using host emulators. The shadow networks are connected to the base network through virtual switches, etc. in order to form a large obfuscated network. When a hacker probes into a host emulator, a more resource-intensive virtual machine can be swapped in to take its place. When a connection is attempted from a host emulator to a physical computer, the a host emulator can step in to take the place of the physical computer, and software defined networking (SDN) can prevent collisions between the duplicated IP addresses. Replicating the shadow networks within the network introduces problems for hackers and allows a system administrator easier ways to identify intrusions.

20 Claims, 10 Drawing Sheets

(56) References Cited

U.S. PATENT DOCUMENTS

| | | | |
|---|---|---|---|
| 7,620,535 B2 | 11/2009 | Shevenell et al. | |
| 7,716,720 B1 | 5/2010 | Marek et al. | |
| 8,612,627 B1* | 12/2013 | Brandwine | 709/240 |
| 8,671,176 B1* | 3/2014 | Kharitonov et al. | 709/223 |
| 8,738,745 B1* | 5/2014 | Brandwine et al. | 709/220 |
| 2002/0157020 A1 | 10/2002 | Royer | |
| 2003/0028803 A1 | 2/2003 | Bunker et al. | |
| 2005/0166072 A1 | 7/2005 | Converse et al. | |
| 2005/0180416 A1* | 8/2005 | Jayawardena et al. | 370/389 |
| 2006/0109793 A1 | 5/2006 | Kim et al. | |
| 2008/0005782 A1 | 1/2008 | Aziz | |
| 2008/0098476 A1 | 4/2008 | Syversen | |
| 2009/0320137 A1 | 12/2009 | White et al. | |
| 2012/0253779 A1 | 10/2012 | Hughes et al. | |

OTHER PUBLICATIONS

McKeown et al., "OpenFlow: Enabling Innovation in Campus Networks," ACM SIGCOMM Computer Communication Review, Apr. 2008 (may be Mar. 14, 2008 as marked on front page), pp. 69-74, vol. 38, Issue 2, ACM, New York, NY.

Mostow et al., "Integration of an Internet Attack Simulator in an HLA Environment," Proceedings of the 2001 IEEE Workshop on Information Assurance and Security, West Point, NY 2001, retrieved from http://citeseerx.ist.psu.edu/viewdoc/download?=10.1.1.118.4335&rep=rep1&type=pdf.

Nicta et al., "Atheros.rb—OMF," Sep. 10, 2010, 4 pages, http://git.mytestbed.net/?p=omf.git;a=blob;f=omf-resctl/ruby/omf-resctl/omf_driver/atheros.rb;hb=fe0bdacc2d5ebff3ea6d99236a930a771362d026, retrieved Jan. 30, 2014.

Rakotoarivelo "Version 5—History—BasicTutorialStage8-5-3—BasicTutorialStage8-5-3—OMF5.3—OMF Developer Portal," Oct. 26, 2010, 5 pages, http://mytestbed.net/projects/omf53/wiki/basictutorialstage8-5-3/5, retrieved Feb. 6, 2014.

Rakotoarivelo "Version 19—History—BasicTutorialStage5-5-3-BasicTutorialStage5-5-3-OMF5.3—OMF Developer Portal," Sep. 23, 2010, pp. 1-8, http://mytestbed.net/projects/omf53/wiki/basictutorialstage5-5-3/19, retrieved Jan. 30, 2014.

Rakotoarivelo "Version 162—History—An Introduction to OMF—An Introduction to OMF—OMF —OMF Developer Portal," Aug. 13, 2010, 4 pages, http://mytestbed.net/projects/omf/wiki/an_introduction_to_OMF/162, retrieved Feb. 7, 2014.

White, "stream.cpp," Sep. 10, 2010, 3 pages, http://git.mytestbed.net/?p=oml-apps.git;a=blob;fr=otg/lib/core/stream.cpp;hb=dd2375ffa3c3d87c04021858919488da4a32b9f3, retrieved Jan. 30, 2014.

"OMF expo_generator.cpp," Sep. 10, 2010, 2 pages, http://git.mytestbed.net/?p=oml-apps.git;a=blob;f=otg/lib/generator/expo_generator.cpp;h=c8479efe443d6df2cca564e9d5d40241a662cla4;hb=dd2375ffa3c3d87c04021858919488da4a32b9f3, retrieved Feb. 6, 2014.

Service set (802.11 network), Wikipedia, the free encyclopedia, Sep. 21, 2010, 3 pages, http://en.wikipedia.org/w/index.php?title=service_set_(802.11_network)&oldid=386170176, retrieved Jan. 1, 2014.

"wlanconfig(8)—Linux man page," Oct. 26, 2010, 3 pages, http://wayback.archive.org/web/20101026073351/http://linux.die.net/man/8/wlanconfig, retrieved Jan. 30, 2014.

PCT application No. PCT/US2013/065775, International Search Report and Written Opinion, Feb. 7, 2014, 8 pages.

* cited by examiner

NETWORK INFRASTRUCTURE OBFUSCATION

CROSS-REFERENCES TO RELATED APPLICATIONS

This application claims the benefit of U.S. Provisional Application No. 61/716,407, filed Oct. 19, 2012, which is hereby incorporated by reference in its entirety for all purposes.

STATEMENT AS TO RIGHTS TO INVENTIONS MADE UNDER FEDERALLY SPONSORED RESEARCH AND DEVELOPMENT

Not Applicable

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Art

The technology described here generally relates to computer networking, and, more specifically, to network infrastructure obfuscation using software defined host emulators, virtual machines, and software defined networking (SDN).

2. Description of the Related Art

Computer networks have become more difficult to protect as they grown in size and complexity. Businesses, governments, and other organizations have seen their computer networks expand to enable internal communication among employees' computers as well as with customers/clients, vendors and suppliers, the general public, and others outside the organizations through the Internet.

Protecting such networks from attack by hackers has become more difficult as hackers' tools have become more sophisticated and their techniques more advanced. With just one entry point, a hacker can map out a network and determine its traffic in order to plot out how to exploit it.

Many resources have gone toward protecting computer networks from external attacks by hackers, such as utilizing better user authentication, improving the robustness of firewalls, and encrypting external traffic. Protecting at the perimeter of a network makes sense because sensitive geographic areas and buildings are protected at their perimeters. Protecting a perimeter allows one to focus protection resources on a limited area, such as an entry or egress point.

More efficient network protection from hackers is sought. There is a need to protect the computer networks against advanced persistent threats and other attacks.

BRIEF SUMMARY

Generally, the connection of many relatively small, resource-thrifty, low interaction, software-based network host emulators to a computer network at similar, pseudo-random times and with similar Internet Protocol (IP) addresses as real, physical computers is described. These host emulators can outnumber the physical computers by a factor of 2, 3, 4, 5, 10, 25, 50, 100, 1000, or more. When a hacker infects a physical computer and begins scanning the network, the real computers are obfuscated within the forest of host emulators. When a hacker connects to one of the host emulators and begins poking around, a relatively large, resource-intensive virtual machine is substituted for the host emulator, enabling complex false data to be presented to the hacker and preserving the false front. The virtual machine can be pre-provisioned to emulate an operating system and patch level that is the same as other, real computers on the network, waiting on warm standby for a hacker to connect to a host emulator before being swapped in.

An attempted connection by a hacker from one of the low interaction host emulators to one of the physical computers can be thwarted by intercepting the connection request and substituting another low interaction host emulator for the physical computer. This is accomplished by copying the IP address of the physical computer to a host emulator and using software defined networking to keep packets from the connection from spilling over to the real network and colliding with packets to and from the physical computer. Against common technical teachings in the art, two hosts (i.e., the physical computer and the host emulator) share the same IP address. A virtual machine can be swapped in for the host emulator if the hacker begins poking around.

Some aspects of the invention are related to setting up software-only, shadow networks, which can be virtual reproductions of a real, physical, base computer network. The shadow networks duplicate the topology, services, host, and network traffic of the base network. The shadow networks are connected to the base network through virtual switches, etc. in order to form a large obfuscated network. When a hacker enters the network, the hacker does not know what is real and what is fake. This can be referred to as a 'house of mirrors' effect. As the hacker attempts to explore or otherwise map out the network, he or she inevitably jumps between a base host and a shadow host. Because it is known that essentially all traffic only flows between base hosts and base hosts, or shadow hosts and shadow hosts, the hacker's jump from a base host to a shadow host (or vice versa) is relatively easy to detect, even on an extremely busy network. The breach by the hacker can thus be identified, and his or her mapping isolated, tracked, or manipulated.

Embodiments of the present invention are related to a method of obfuscating physical computers on a computer network from hackers. The method includes capturing packets on a computer network of physical computers, monitoring the captured packets to ascertain a schedule of connection activations and deactivations of the physical computers on the network, surveying a logical topology of the computer network, instantiating and initializing a plurality of software-based host emulators, each host emulator configured to respond to an Internet control message protocol (ICMP) echo request packet, obtaining an Internet protocol (IP) address for each host emulator based on the surveyed topology, and connecting the host emulators to the base computer network over time based on the ascertained schedule and a random number generator, the connecting substantially interleaving the connecting of the host emulators with connection activations of the physical computers.

The method can include identifying an operating system used by at least one of the physical computers, initializing a virtual machine that emulates portions of the identified operating system, receiving, by a first host emulator of the host emulators, a request to establish a connection, and replacing the first host emulator with the virtual machine by assigning the IP address of the first host emulator to the virtual machine and establishing, using the virtual machine, a connection in response to the request, or responding, using the virtual machine, to traffic associated with an established connection. The initializing of the virtual machine can occur before the receiving of the request to establish the connection, the virtual machine being kept on warm standby until the replacing.

The method can further include receiving, by a second host emulator, a second request to establish a second connection and re-tasking the virtual machine by assigning the IP address of the second host emulator to the virtual machine and establishing, using the virtual machine, a connection in response to the second request, or responding, using the virtual machine, to traffic associated with a connection established by the second request.

Some embodiments are related to a method of containing a hacker within a shadow portion of a computer network. The method includes instantiating and initializing a plurality of software-based host emulators, each host emulator configured to respond to an Internet control message protocol (ICMP) echo request packet, obtaining an Internet protocol (IP) address for each host emulator, connecting the host emulators to a computer network having physical computers, intercepting a request to establish a connection between a first host emulator of the host emulators and a first physical computer of the physical computers, determining an IP address of the first physical computer, assigning the IP address of the first physical computer to the second host emulator, the first physical computer keeping its IP address, routing, using software defined networking (SDN), the intercepted request to the second host emulator, and establishing a connection between the first and second host emulators using the routing.

The method can include identifying an operating system used by at least one of the physical computers, initializing a virtual machine that emulates portions of the identified operating system before the request is intercepted, wherein the virtual machine is on warm standby until the request is intercepted, ascertaining that the identified operating system is the same as an operating system of the first physical computer, and assigning the IP address of the first physical computer to the virtual machine.

The method can include identifying a patch level of the operating system and initializing the virtual machine to emulate portions of the identified operating system in accordance with the identified patch level.

The method can include providing host emulators on a second computer network having physical computers, intercepting a second request to establish a connection between the second host emulator and a second physical computer on the second computer network; determining an IP address of the second physical computer, assigning the IP address of the second physical computer to a third host emulator of the second computer network, the second physical computer keeping its IP address, routing, using SDN, the intercepted second request to the third host emulator, and establishing a connection between the second and third host emulators.

Some embodiments relate to a method of setting up a computer network to obfuscate hackers. The method includes mapping physical hosts on a base computer network, including identifying a type and Internet protocol (IP) address of each physical host on the base network, determining a topology of the base network from the mapping, determining one or more services available on the base network from the mapping, capturing packets on the base network, identifying, from the captured packets, a network traffic pattern, the network traffic pattern including a frequency of communication, communication protocol, connection time, or source and destination IP address for a communication on the network, generating instructions for creating a shadow network from the topology, available services, and network traffic pattern, the shadow network having substantially the same topology, available services, and network traffic pattern as the base network, creating at least one shadow network using the generated instructions, and connecting the at least one shadow network to the base network.

The method can include storing a topology of the mapped network in an extensible markup language (XML) format, and the capturing of packets can include port mirroring. The method can include making a topological network change to the shadow network using software defined networking (SDN). The instructions can be in a format selected from the group consisting of extensible markup language (XML) and JavaScript® Object Notation (JSON).

Some embodiments relate to a method of detecting anomalous behavior on a computer network. The method includes mapping physical hosts on a base computer network, including identifying a type and Internet protocol (IP) address of each physical host on the base network, determining a topology of the base network from the mapping, determining one or more services available on the base network from the mapping, identifying, from captured packets on the base network, a network traffic pattern, the network traffic pattern including a frequency of communication, communication protocol, connection time, or source and destination IP address for a communication on the network, generating instructions for creating a shadow network from the topology, available services, and network traffic pattern, the shadow network having substantially the same topology, available services, and network traffic pattern as the base network, creating at least one shadow network using the generated instructions, the shadow network having shadow hosts, connecting the at least one shadow network to the base network, and detecting a communication between one of the physical hosts and one of the shadow hosts, thereby detecting an anomalous communication.

The method of can include detecting a change to an application on the shadow network that is not defined by the instructions or a new application running on a shadow host, thereby detecting an anomalous communication.

Some embodiments relate to a method of visualizing anomalous behavior on a computer network. The method includes mapping physical hosts on a base computer network, including identifying a type and Internet protocol (IP) address of each physical host on the base network, determining a topology of the base network from the mapping, determining one or more services available on the base network from the mapping, identifying, from captured packets on the base network, a network traffic pattern, the network traffic pattern including a frequency of communication, communication protocol, connection time, or source and destination IP address for a communication on the network, generating instructions for creating a shadow network from the topology, available services, and network traffic pattern, the shadow network having substantially the same topology, available services, and network traffic pattern as the base network, creating at least one shadow network using the generated instructions, the shadow network having shadow hosts, connecting the at least one shadow network to the base network, generating an image including symbols representing physical hosts and shadow hosts, and altering one of the symbols in the image based on a detection of an anomalous communication.

The method can include zooming out from the image, and replacing a set of the symbols representing physical hosts and shadow hosts with a single symbol representing a network of the physical hosts and shadow hosts. The zooming out can be triggered by reverse pinching. Interaction can include zooming in, zooming out, rotating, scrolling, panning, clicking, double-clicking, swiping, grabbing, or pinching in order to manipulate a view of the image of the physical hosts and shadow hosts.

Some embodiments relate to filling a predefined percentage (e.g., 90%, 95%, 100%) of space in a subnet using host emulators (and/or virtual machines). That is, the number of physical computers plus the number of host emulators divided by the total number of IP addresses available in a subnet is the percentage. A network protection device can produce host emulators that request from a DHCP server all of the IP addresses in a subnet. To keep the percentage constant, when a physical computer is connected a host emulator gives up its IP address to the DHCP server for the physical computer. When a physical computer is disconnected, a host emulator requests the IP address. This can be useful in filling up an entire subnet of IP addresses so as to maximize the chance that a hacker will fall upon a host emulator.

Yet other embodiments relate to systems and machine-readable tangible storage media that employ or store instructions for the methods described above.

DETAILED DESCRIPTION

Figure 1:
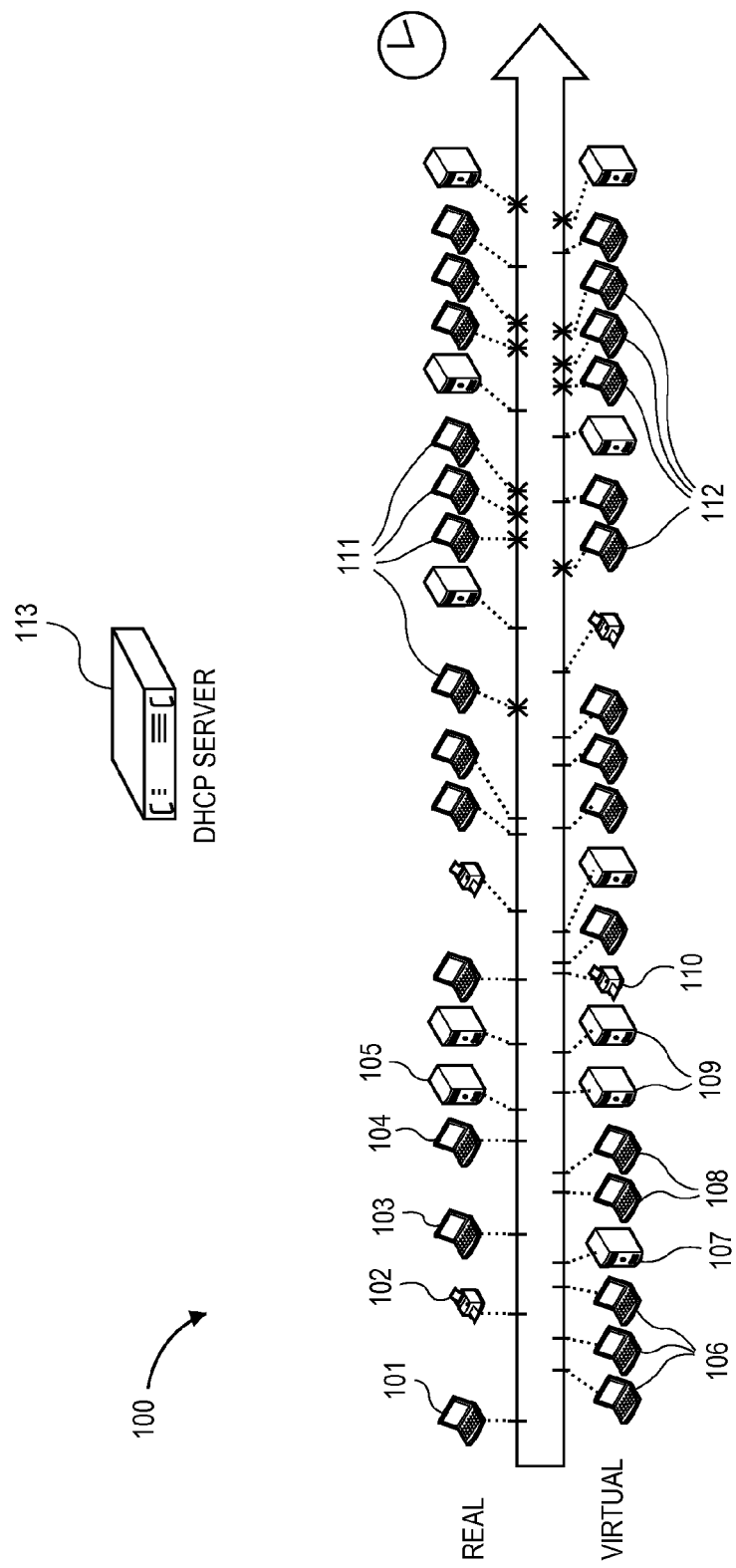
FIG. 1 illustrates a timing diagram of real, physical computers and host emulators being connected to a network in accordance with an embodiment.

Some terms used herein are defined below. Unless otherwise specified, each term is as defined as well as that recognized by one of ordinary skill in the art.

DEFINITION OF TERMS

A "base network" includes a network of elements, including, but not limited to, routers, switches, servers, devices, displays, computers, services, activities, and interconnects, that is the subject of the methods described here, or as otherwise known in the art.

A "shadow host" includes an execution container including, but not limited to, a virtual machine, jail, app container running an appropriate operating system (OS) and application stack network node, that represents a low, medium, and/or full interaction host and/or device (e.g., a router, switch, server, devices (e.g., mobile, serial), display, computer, service, administrative activity, and interconnect), or as otherwise known in the art.

A "shadow network" includes a network, created using the methods described here, that is a realistic replication of the base network. The shadow network can be used for a variety of purposes including, but not limited to, cyber-security host and network obfuscation applications, testing of security systems, and training of network administrators, or as otherwise known in the art.

An "obfuscated network" includes a base network being obfuscated by inserting one or more shadow hosts participating in one or more shadow networks, or as otherwise known in the art.

An advanced persistent threat (APT) is a cyber-security threat for which an organized entity such as a foreign government is typically responsible. An APT is usually targeted at a specific network, and it can be designed for intelligence-gathering purposes or to damage/disable the target network. The APT will persist in its attempts to access or attack its intended target.

A "zero day threat" is a threat that exploits a hitherto unknown vulnerability in the system. This implies that there is no time to develop a patch before an attack occurs.

Computer networks that use the Transmission Control Protocol (TCP) of the Internet Protocol suite (IP) are commonly called TCP/IP networks. TCP is used to transfer email, files, and for connecting to the World Wide Web by web browsers. The User Datagram Protocol (UDP) can be used in conjunction with TCP on TCP/IP networks.

Like TCP, the Internet Control Message Protocol (ICMP) is a core protocol of the Internet Protocol Suite.

Ascertaining a "schedule of connection activations and deactivations" includes determining times of day that a computer is connected and disconnected from a network by using associated packet traffic, or as otherwise known in the art. A schedule does not require precise times to be determined, as users typically turn on and off computers, or log in and off, according to inexact times.

An Internet control message protocol (ICMP) "echo request packet" includes packets issued from ping to a target computer and typically comprise 20 bytes of an IP header, 8 bytes of an ICMP header, and optional bytes of payload data, or as otherwise known in the art.

A "random number generator" includes a pseudo-random number generator, typically seeded by access to a hardware function on a processor, accessed through an operating system call to the hardware, or as otherwise known in the art. A random number from a random number generator can be used to select a random time or time delay, within a probability distribution, for a connection or disconnection from a network.

A "request to establish a connection" can include a SYN message from a TCP three-way handshake, common to start in TCP/IP connections. It can also include a SYN, SYN-ACK, ACK set of messages to establish a connection, or as otherwise known in the art.

"Substantial interleaving" in time with a schedule of events includes points in time before, during, and/or after each event, but does not require that every two events have an interleaved point in time between the events be accounted for.

A "virtual machine" is a software-emulated computer that emulates operating system-specific functions of another computer, or as otherwise known in the art. For example, a Unix workstation can emulate a personal computer (PC) running Microsoft Window 8. One or more virtual machines can run on a single physical computer, and one or more physical computers can run a single instance of a virtual machine.

End-Use Applications of the Technology

Potential end-use applications of the technology include cyber security, network security testing, cyber threat detection, threat neutralization and localization, network monitoring, and training for network administrators and network security teams.

The use of the technology is not limited to obfuscation. An embodiment might be used, for example, for training network administrators. A network administrator may be responsible for the installation and maintenance of hardware and software comprising a computer network. It would be beneficial to train a network administrator using a "realistic network". Activities such as deployment, re-configuration and corrective maintenance can pose a risk for a network. Embodiments may provide a mechanism for training a network administrator on these and other activities in an environment indistinguishable from a real network.

Background and Differences Over the Prior Art

The technology described here can be applied to provide security solutions for computer networks. The technology generally uses a different approach to infrastructure obfuscation than existing firewall or "honeypot" technologies and provides a higher level of security.

Existing network security solutions may rely primarily on perimeter defense ("castle walls"), with firewalls placed at key points around the assets and resources, protecting the "inside" from the "outside". A typical firewall configuration provides North-South protection. I.e., it is designed to protect the core of the network from attacks at the periphery.

Network infrastructure obfuscation embodiments described here can provide East-West protection in addition to North-South protection. This is because such embodiments can identify attacks that generate traffic across the network as well as attacks that generate traffic between network elements at the edge of the network and servers at the network's core. North-South network traffic is more common in centralized (hub and spoke) networks. East-West traffic is more common in a de-centralized network. With the growth in server virtualization, the network architecture is apparently becoming more de-centralized, and the approach to protecting the network should adapt and become more flexible to recognize threats in North-South and East-West network traffic.

Some network security solutions include scanning at devices on the perimeter of the network and also devices embedded within infrastructure communication systems, such as email and messaging applications. Other security systems may employ layered security, defense-in-depth, end-point security, sandboxing, security appliances both physical (hardware) and virtual (software), and security information and event management solutions able to manage and do analytics on security events.

Yet many such existing systems remain vulnerable to new attack vectors, exploiting zero day vulnerabilities on applications and operating systems, and coupled with the proliferation of mobile devices and new modes of infection such as phishing. In particular, systems may be vulnerable to advanced persistent threats. These tend to be highly customized and coordinated, targeted and sustained attacks and are particularly hard to defend against because they utilize a wide variety of attack vectors.

Network security teams face a number of challenges including the large number of channels into an organization (WiFi, USB flash drives, mobile devices, VoIP and the like), the size and diversity of the infrastructure requiring protection, the number and diversity of applications (including plug-ins), and the overwhelming amount of network traffic to monitor and scan.

Existing approaches typically choose to shrink the footprint of the network. The network infrastructure obfuscation technologies described here may take an opposite approach and seek to make the footprint of the network as large as practical.

Existing approaches typically operate by limiting, controlling or monitoring traffic as it enters or leaves the network and limiting what can be run inside the network, e.g., by whitelisting applications and using packet inspection to find network violations. The danger inherent in existing approaches like these is that they may provide a template to the attacker for where and how to attack.

Other vulnerabilities typically not covered by existing network security methods include human error and reverse engineering of the firewall. Also, connections between different networks remain vulnerable to attack because this issue is not adequately addressed by these existing methods.

In other examples of existing approaches to network security, a router or switch in the network may keep a whitelist of IP addresses. If traffic originates from an IP not in the whitelist, then the security system may raise an alert.

In existing approaches such as honeypots and honeynets, it is possible for threats such as malware to detect that the network environment is emulated and simulated. The behavior may not be realistic, for example applications running in the network may not be typical of the more dynamic environments, and specific timings may not be accurate or credible. In addition, the honeynet and honeypots are static, often deployed with physical bridges, scripted responses, and static data—that can make the cost of deployment the same as deploying a regular host.

Present embodiments may take a different approach. An attack can happen from many different vectors including outsider threat, insider threat and automated malware. The technology assumes the network will come under attack and become infected at some point. The approach is therefore to detect attacks, intrusions and infections, and limit their propagation through the network. The present approach creates an environment for the threats that is real rather than deceptive to an attacker.

Embodiments may use virtualization techniques to create an obfuscated network infrastructure from a base network. They can work on the principle that unexpected behavior in obfuscated network can be an indication the system has come under attack and may be compromised. Furthermore, certain assets can be purposefully introduced into the obfuscated infrastructure to allow a network security team to follow the digital trail outside the perimeter of the base network, to trace the source of the attack and the path taken to exfiltrate the data.

Some elements of the present technology include:

A process of discovery on the base network

The creation of instructions for reproducing the operational base network as one or more shadow networks, and/or reproducing operational nodes in the base network to include insertion of realistic documents, configuration files, and processes over time.

Virtualization of the shadow networks and hosts

Interleaving of the shadow networks and hosts with the base network in order to hide and protect real resources Monitoring the interleaved network dynamically to increase the likelihood of a connection by an unexpected behavior or threat Detection and containment of the threat with the ability to neutralize detected threats in the shadow network and provide information that provides insight into how to contain threats on the real network.

Shadow execution containers acting as hosts (shadow hosts, sometimes referred to as "host emulators") may be interleaved into the existing base network, as described above. Each execution container host may have an Internet Protocol (IP) address and may be represented as a virtual machine to behave just like normal computer. For example, if ten shadow hosts are inserted into an existing corporate subnet 10.55.2.x, then subnet 10.55.2.x becomes an obfuscated network. Rather than just adding shadow hosts as part of an obfuscated shadow network, the base network may be replicated to replicate all of the real network hosts with an IP on that subnet into an interleaved shadow network. In this case, if the attacker lands on a shadow host in this first interleaved shadow network, these replicated shadow hosts can be presented to the attacker once they have entered the first virtual host on that same shadow network—this giving the appearance that they are still in the real network given the IP structure, but are in fact living in the shadow network. This acts as an advanced containment mechanism against the attacker. Additional networks (i.e. shadow networks), with IP addresses of, say, 10.55.3.x and 10.55.4.x can also be presented to the first shadow network representing hosts that may or may not be on the original real network. If, furthermore, the two shadow networks are added to the base network 10.55.x.x, then the entire network 10.55.x.x is obfuscated.

Functional Elements of the Technology

The present technology consists of a number of functional elements as described in the following sub-sections.

Base Network Discovery and Creation of Instructions

The process of discovery involves monitoring the base network for a period of time.

The steps in the process of discovery about the base network can include:

a) Identifying all the network elements
b) Identifying all the connections between network elements
c) Identifying the topology of the network
d) Understanding the network behaviors
e) Understanding the timing of traffic between network elements.

The process of discovery can be different than simply recording network traffic flow. It combines defining the traffic flows corresponding to the network behaviors with mapping of the network topology. The discovery technology creates metadata around the traffic flows and topology to further understand the types of users and devices generating activities on the network. The results are documented in sufficient detail to eventually reproduce a complete copy of the operational base network. The copy is known as a shadow network.

Shadow networks may be implemented using Software Defined Networking (SDN). SDN is a networking architecture in which a) the control plane is implemented in software hosted on servers that are separate from the network equipment, and b) the data phase is implemented in commodity network equipment. A shadow network can be interacted with just as if it is the real network. It operates and feels like the real network being targeted for attack because it is real. The only difference in some embodiments is that the shadow network does not contain the proprietary information, sensitive data, and live users contained in the actual network it is cloaking. Fake data may be placed in the obfuscation layer of a shadow network so that analytics could be performed to track and identify an attack that targeted the fake data. It would then be possible to determine what assets were being targeted and how. Also, as part of the obfuscation technology, there may be virtual actors interacting with the network to generate behaviors consistent with behaviors that live users would be generating on the actual (base) network.

Base Network Discovery

Discovery of the base network involves two stages—networking mapping and packet capturing.

Network Mapping

Network mapping may be accomplished by means of a mapping tool. The functions of the mapping tool may include sending out packets to the hosts on the network, waiting for responses and analyzing the responses to understand for example whether the host is on the network, what type of host it is, and what its IP address is. The way the host responds can indicate what type of host it is, for example it may be possible to classify it as a mail server on the basis of the port it responds on. Other types of host may include hosts running operating systems such as Windows or Linux, or may be a printer, or a host providing a service (such as mail).

An example tool suitable for mapping the network is Nmap (Network Mapper) which is open source and is able to discover hosts and services on a base network. As described above, Nmap sends communications to the target hosts in the base network and then analyzes their responses. Other suitable open source or commercial tools may be used.

Nmap may be run on the Classless Inter-Domain Routing (CIDR) spacing used by the base network. The CIDR spacing can be discovered by doing a blind scan or from information provided by a network administrator for the base network. An Nmap command to map a network on 192.168.1.1/24, for example, and store all the results in an XML document, may be as follows:

Nmap-oX networkscan.xml 192.168.1.1/24

Once the scan is complete, all the discovered hosts and services may be found in an (extensible markup language) XML-formatted document. The XML document may be parsed and analyzed to provide input to the instructions for generating a shadow network.

From the results of network mapping, an embodiment may determine the topology of the base network and the services operating on the network.

Packet Capture

A second stage of discovery can be packet capture. The purpose of packet capture is to understand and define the behaviors of devices, processes and users on the network. Example questions to be answered during this stage include a) how often do processes communicate b) what protocols are used in communication c) what are the connection times, d) what are the source and destination IP addresses for the packets, and e) at what rate to machines spin up and connect to the network and/or be removed from the network?

Once captured, packets may be analyzed by a suitable tool, for example, Wireshark—a network protocol analyzer. Packets arriving from the port span may be captured using an API such as pcap. The pcap data may contain for example a) the connection time of a process b) the source and destination of the connection, c) the protocol being used, d) additional information such as response messages, e) the actual data flowing across the connection, and f) the uptime of machines and lifecycle of machines that are connected and disconnected from the network (e.g., laptops plugged in and disconnected each day). Depending on the protocol (e.g. http vs. https), the data flowing across the connection may be encrypted data.

The combination of network mapping and packet capture to create instructions for generating a shadow network is believed to be novel.

Creation of Instructions

Creating the instructions for generating one or more shadow networks can involve two steps—base network analytics and the writing of instructions in a suitable network description language.

Base Network Analytics

Network analytics may be used to create a complete description of the base network that includes hosts, services, processes, connection times, source and destination addresses for packets in inter-process communication, and behaviors of the network. Information extracted from the XML document, for example, may include a) the types of host (e.g. Windows, Linux and other operating systems) and their address spacing, and b) services present on the network (e.g. web, ftp, ssh, mail, active directory, client-server, and the like). Understanding the services present on the network allows the present technology to determine which operating systems, protocols, and applications need to be placed on hosts in a shadow network.

The pcap data may be analyzed to understand the behavioral patterns of the base network so that the behaviors include services, protocols, and host connection and disconnection patterns over time in different subnets that can be reproduced in a shadow network. For example, the pcap data may be parsed to determine how often each host is connected and disconnected from the network and which protocol it is using. This information may be used to create a timeline for introducing the hosts with similar behaviors in a shadow network and have substantially the same characteristics as the real surveyed network. Timing information may be expressed statistically, for example as a mean and standard deviation. Using the destination IP address information, an embodiment can ensure that servies and uptime behaviors are blended in via the shadow hosts and networks, i.e. the same destinations targeted in the base network.

Active Deception with Networks and Hosts

Using an SDN and a dispatcher to spin up shadow execution containers, hosts can be presented at scale (e.g., many thousands) of apparent hosts that appear realistic in early communications and across multiple subnets. When attacks on physical and virtual shadow hosts are suspected to occur based on alearting or anomaly detection, or are actively propagating on the shadow network, full interaction hosts can be moved (or herded) through the reconfiguration of IP addresses and dynamically interleaved within subnets. This allows an active response to an attacker's actions and provides a deceptive presentation of hosts to the attacker in order to draw them out (i.e., bait) or determine the attacker's intention.

Network and Host Virtualization and Control

Once the information about the base network is known, an embodiment can reproduce the base network as one or more shadow networks. In some cases, the base network is reproduced multiple times in the obfuscated network to create a large footprint for the combined network (the obfuscated network) which has advantages for threat detection. The obfuscated network may include network subnets and address naming scheme conventions consistent with the base network.

The system may create obfuscated hosts of different types and at different patch levels. These hosts may be created as virtual machines or less realistic analogs that are referred to as "execution containers." Execution containers can emulate basic functions of the endpoints of application connections. The hosts can participate in varying levels of application and user-stimulated conversations across the network. The system can control and manage the hosts to perform activities such as the bringing up and down of operating system images and placement and attachment of these hosts to the appropriate locations in the network. The system may also shut down and quarantine hosts that might be infected.

An embodiment may use Software Defined Networking (SDN) for network control. This allows the system to make topological network changes and traffic flow redirections in reaction or preparation to events that occur within the network. SDN may be used to connect provisioned hosts to the network fabric. The network can be provisioned in software and then connected to the network equipment.

A shadow network may be generated from the network description language using a parser program to read it in and execute the instructions, and a hypervisor or Virtual Machine Manager (VMM). Any suitable tools may be used for this purpose. Some specific example tools for generating a shadow network on a single server include the following:

a) Bridge devices—to emulate Ethernet switches, for example. VMs can attach to the bridge devices and communicate with each other.

b) Kernel VM (VMWare, KVM)—to provide high-performance, full interaction VMs and appear as real host machines on the network c) Kernel Samepage Merging (KSM)—to reduce memory usage by sharing memory across VMs, and A shadow network (as described in the network description language) is a collection of networks (i.e. switches/bridge devices) and machines that connect to the networks, or as otherwise known in the art. The generation of a shadow network starts with the creation of the bridge devices, followed by the creation of the KVM virtual machines, and the attachment of the VMs to the appropriate networks.

While networks inside the environment are generally isolated from one another (with two machines communicating only if they are on the same network), an administrator may place routers and gateways inside a shadow network to route packets as desired.

Memory exhaustion may be mitigated using KSM, and also by spreading VMs across multiple servers. The discovery of secondary servers, and load balancing between servers, can be done automatically, and the generation of shadow networks can be made scalable.

The operational base network and the virtualized shadow networks can be interleaved to create a seamless obfuscated network. Interleaving the networks allows the technology to detect East-West attacks. This can happen either from a new exploitation of a vulnerability or from an insider threat. Once a machine in the network is compromised, it is often used as a beachhead to further attack and exfiltrate information out of the target network. With shadow networks grafted in to the obfuscated network, further propagation and detection of these attacks can be caught and mitigated. In some implementations, the combined network is configured to be several times larger (e.g. 10x) than the base network by reproducing and interleaving multiple copies of the base network. Actual network traffic is allowed to communicate oblivious to the presence of the shadow hosts and networks. However, to an attack vector, the logical view of the network is many times the size of the actual network. This makes it very difficult for the attack vector to determine which network or device/host should be targeted. For instance if there were 1,000 hosts and 9,000 shadow hosts then by the law of numbers an attack generally has a 90% chance of hitting the shadow hosts of the obfuscated network and only a 10% chance of hitting the actual (base) network.

Once a VM is presented through SDN to a real physical network, the hosts appear identical to physical machines attached to the network. A VM can be statically specified or can request an IP address from the Dynamic Host Configuration Protocol (DHCP) server on the network, and once connected a VM can connect to a physical machine (and vice versa).

Any traffic generated on the shadow network can spread to the physical network according to the level of containment that is defined for the shadow network hosts. VMs can be indistinguishable from physical machines on the same network.

Behavior Generation

An embodiment can generating the general behavior of the base network in the obfuscated network(s). The purpose of generating similar and logically extended behavior is to create the appearance of similar blended entities (e.g. people, servers and the like) on the network.

Behavior generating includes but is not limited to:

Generation of the operating system (including different operating system types and versions, configurations, patches and updates)

Generation of applications consistent with the base network (including where appropriate application servers, database servers, enterprise applications, processes and log files)

Generation of network messages, including broadcast and multi-cast messages and responding to network probes and other messages Generation of devices and server/hosts to mimic endpoint platforms accurately to the extent that information gathering tools used during an exploitation phase can function as if they were on a real-world device in the base network. The security platform can observe and record such an exploitation without being detected.

Generating host spin up and/or spin down into the network over time, similar to the distribution of OS configurations, update behaviors, services, and protocols used in the real network. This may include, for example, file shares, mounted devices, web-browsing, e-mail and use of enterprise applications such as customer relationship management to determine the generation of blended shadow hosts to obfuscate these host functions.

System process configurations and other aspects of system behavior may be consistent with a particular physical location of deployment. This increases the level of obfuscation and protects against threats that infect obfuscated hosts and perform their own surveillance of the environment.

One approach to behavior virtualization is to use virtual machines and to create a new virtual machine (VM) for each entity (e.g. person, server and the like). Such an approach may not be scalable since each VM adds overhead. It is therefore preferable to use one VM for many entities.

An embodiment can use a special VM, known as a "conductor", able to generate many entities or interfaces (each with its own MAC and IP addresses) on a single VM.

The VMs create the behaviors on the shadow network. The command and control of the VMs is invisible to an attacker.

The behaviors across all subnets and hosts may be stored in a centralized database and service that is accessible via an integrated administrative system so that behavior generation across all hosts can be coordinated.

More than one conductor VM may be created and placed on the obfuscated network. Behavior virtualization is scalable by increasing the number of conductor VMs and also by spreading a shadow network across multiple servers.

Anomalous behavior detection—host and network

An embodiment can detect anomalous behavior in the entire obfuscated network. Anomalous behavior may be, for example, unexpected network connections to hosts in the obfuscated network, unexpected activity on the obfuscated network or unexpected changes to applications or configurations on hosts in the obfuscated network.

When the networks are interleaved in the manner described here, the behavior of the network is predictable. Behavior that is not predicted may be an indication of an infection or attack. For example, in some networks, it may be that no connections are expected to be made (during normal operation of the base network) by the base network to any of the shadow networks. If a connection is made to a shadow element in the obfuscated network, it can be assumed to be malicious if it is not on a white list. The connection may be assumed to be malicious if it does not match normal operating heuristics of the network. As a specific example, consider a shadow network using the CIDR 10.0.1.1/16. If the shadow network receives a connection from 172.3.2.1 then the system generates an alert because the IP address is not in the CIDR spacing of the shadow network.

A malicious connection may be contained by re-directed host communications to the real network with a shadow host that has the same IP configuration as the original real host, i.e., to a different host on the shadow network where the connection can be kept alive and monitored, with little to no risk to the obfuscated network's integrity.

Since the system is in complete control of all the endpoints in the conversations of shadow networks, it can recognize new connections that are unexpected or unexpected network activity, such as broadcast or multicast traffic not initiated by the system itself. It can also detect when new files and binaries are loaded onto hosts in the shadow network, for example.

Furthermore, each host in the shadow network has a defined set of processes and behaviors operating on the shadow hosts. The system may generate an alert whenever there is a deviation from the defined processes or behaviors. As a specific example, consider the case where a new process nc.exe is started on a shadow host. In this case, the process is recognized as a hacking tool, and the system generates an alert.

When a threat is detected in the obfuscated network, the system may generate an alert. The network security team may configure the system to monitor the threat and to slow down the propagation of the threat. The system may disconnect the infected host(s) and disinfect them. The system can allow continued interaction with the base network or can actively direct the threat away from the base network and preferentially back into a shadow network. New shadow networks may be created in real-time in response to a threat, to provide a contained environment in which to analyze and monitor the threat. The system may also reconfigure the networking topology on the fly into a new configuration. For example, the system may use SDN to control the network fabric and may use an open standard such as OpenFlow® or any other suitable approach to control traffic flows. SDN may be used to redirect the threat seamlessly to a contained environment.

False positives may be detected through exception handling. An embodiment can allow the addition of new exceptions to be configured within the technology as needed.

On legacy networks that do not support a technology such as SDN or OpenFlow®, an alert on the base network can point a network administrator to the infected host. On a shadow network, a technology such as SDN or OpenFlow® can be used to contain the attack vector and the propagation of the attack.

If a host on the base network becomes compromised (i.e. is attacked or infected) and it attempts to connect to the shadow network, an embodiment can raise an alert, and can provide the base network administrator with the IP address of the compromised host so that the threat can be mitigated by any suitable means.

If a host on the shadow network becomes compromised, an embodiment can re-direct traffic flow to a containment area without alerting the threat and allow it to continue communicating. Further analysis can then be done on the attack while it is still in progress.

Visualization and Analytics

An embodiment may log and monitor attacks in progress, and it may generate alerts into existing organizational systems to inform the users of such attacks. The security platform may provide a monitoring console that allows the user to see network and health information, usage statistics for system resources and any anomalous behavior on hosts and networks.

The system may gather data from all the shadow network hosts, as well as from the base network, thereby providing a view into other connection patterns within the system. The data may be stored within a data warehouse or similar structure that allows for post-infection and attack analytics. It may also gather data from agents working on base network hosts to direct traffic to the shadow network (e.g., honeytokens). This information can be used to trigger alerts and dynamically deploy additional shadow hosts and networks in order to create more density and increase the likelihood of intercepting attack vectors.

DETAILED DESCRIPTION OF FIGURES

FIG. 1 illustrates a timing diagram of real, physical computers and host emulators being connected to and disconnected from a network in accordance with an embodiment. In schedule 100, the connection of real and virtual computers to a network are interleaved together, and the IP addresses that are obtained from Dynamic Host Configuration Protocol (DHCP) server 113 reflect the sequence of connections. Time increases to the right.

A "real" computer in this context is synonymous with a physical computer. A "virtual" computer in this context is synonymous with a host emulator, virtual computer, application container, shadow host, or other virtual computer that exists entirely in software.

At a first point in time, physical computer 101 is turned on and connected to the network, followed by printer 102 and computers 103 and 104. Server 105 and other devices are subsequently activated and connected to the network.

Interleaved with the connection times of the real devices are the connection times of host emulators. After computer 101 is activated but before computer 103 is activated, three host emulators 106 are connected to the network. Each of these host emulators may request an IP address from DHCP server 113 at its time to connect to the network. Virtual printer 107 is connected soon after real printer 102. Host emulators 108 are connected soon after physical computer 103 is connected, and host emulators 109 are connected randomly around the timeframe that physical server 105 is connected. Another virtual printer 110 is connected as well, prior to another physical printer being connected.

These connection times are randomly interleaved so as to confuse hackers. A hacker may monitor activity on a network over the course of a day to determine when certain computers are on or off and when the busiest times in an office are. By randomly interleaving virtual and real laptops, servers, printers, mobile devices, and other computers with each other, it become difficult, if not impossible, for a hacker to immediately determine which devices are fake and which are real.

Disconnections from the network are also interleaved so as to create a realistic environment. For example, as real people turn off their real computers 111 at the end of a workday, virtual host emulators are disconnected from the network around the same time, interleaved with the disconnections of physical computers 111.

Figure 2:
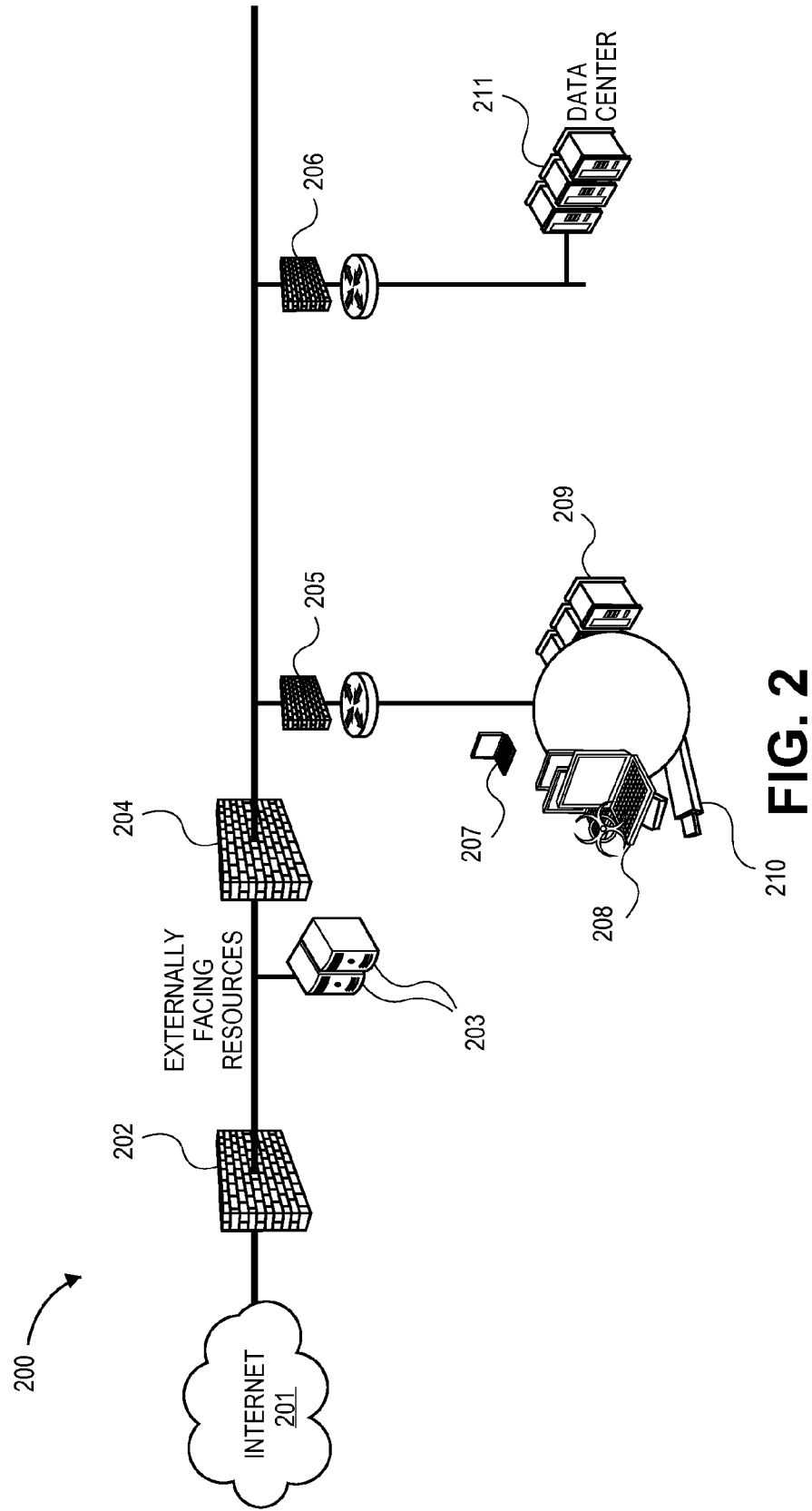
FIG. 2 illustrates a network laptop computer being infected from a universal serial bus (USB) key on the inside.

FIG. 2 illustrates a network laptop computer being infected from a universal serial bus (USB) key on the inside. In the system shown, a company's computer network 200 is connected with Internet 201 and protected by firewall 202. Externally facing resources, such as the company's public web server and customer portals, are hosted on servers 203. Internal company bandwidth is further protected behind a second firewall 204.

Firewall 205 protects an internal company network used by employees while firewall 206 protects the company's sensitive data center servers 211. In the employee computer network behind firewall 205, physical computers 207, 208, and 209 are located. These computers may include laptop computers, server computers, printers, smart cellular telephones, Internet devices, switches, routers, and other general purpose and application-specific computers.

At some point, an employee brings in to work an infected USB key and plugs it into his or her work laptop computer. A virus or other malicious code from a hacker uses the connection to infect the employee's physical computer 208, the physical computer having the IP address 192.168.1.21. Note that no firewall was directly penetrated by the virus. Unfortunately, this is a common occurrence in company networks.

Figure 3:
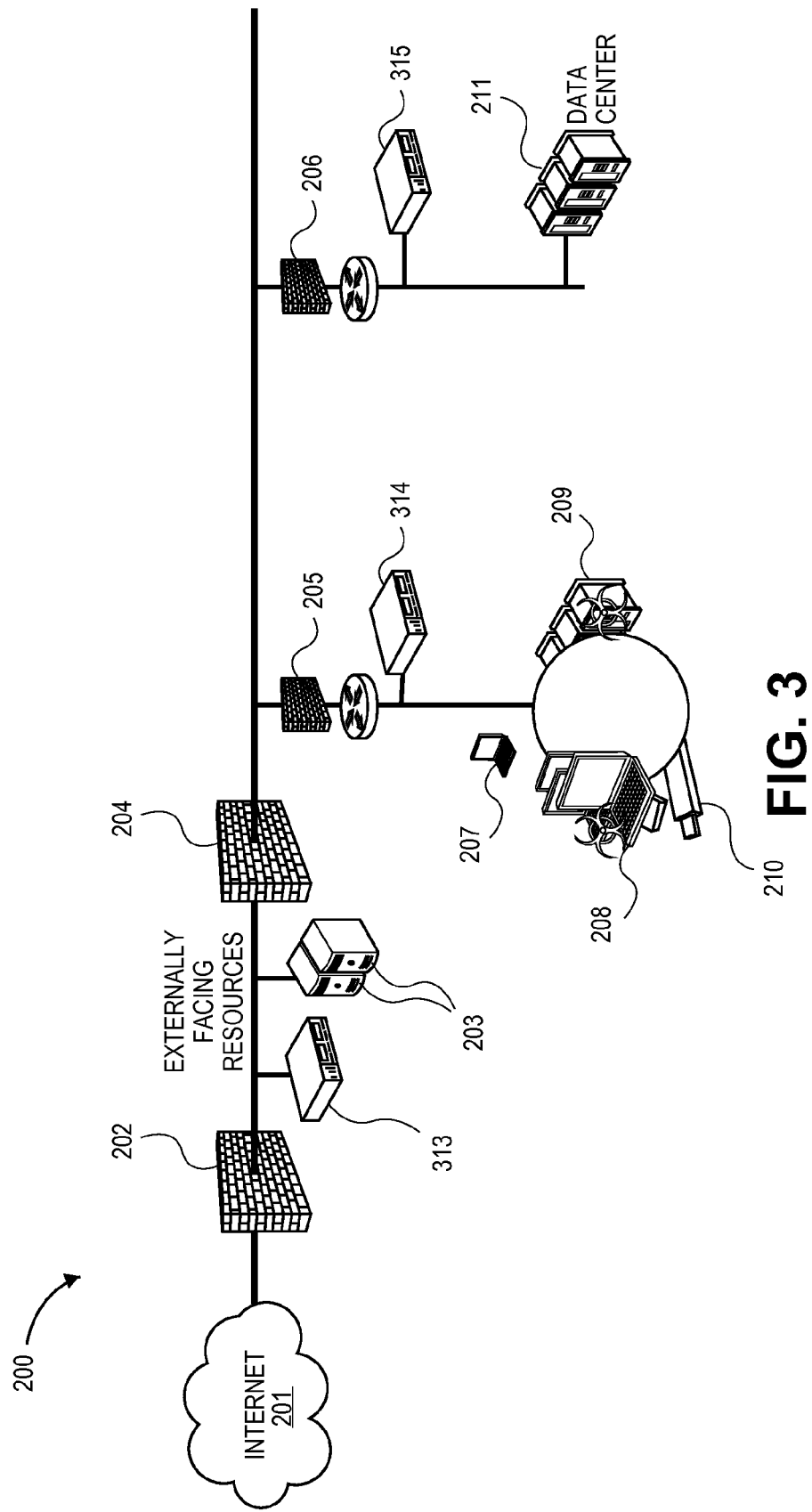
FIG. 3 illustrates a server computer being infected from the infected laptop computer in FIG. 2.

FIG. 3 illustrates a server computer being infected from the infected laptop computer in FIG. 2. The malicious code from infected computer 208 establishes a connection with physical server 209 and moves or replicates itself on physical server 209. That is, host 192.168.1.21 connects to real server 192.168.1.22 as the next target of propagation. Now that the malicious code can execute on a server, a hacker from outside the firewall can use it to explore the rest of the network for vulnerabilities.

Network protection devices 313, 314, and 315 may be connected to the company's network behind the various firewalls. Network protection device 313 is connected to the externally facing resources network behind firewall 202. Network protection device 314 is connected to the internal-employee computer network behind firewall 205, and network protection device 315 is connected at the data center behind firewall 206. These 'single-box' devices can form a shadow network alone or in conjunction with one another, protecting the network as will be described.

Figure 4:
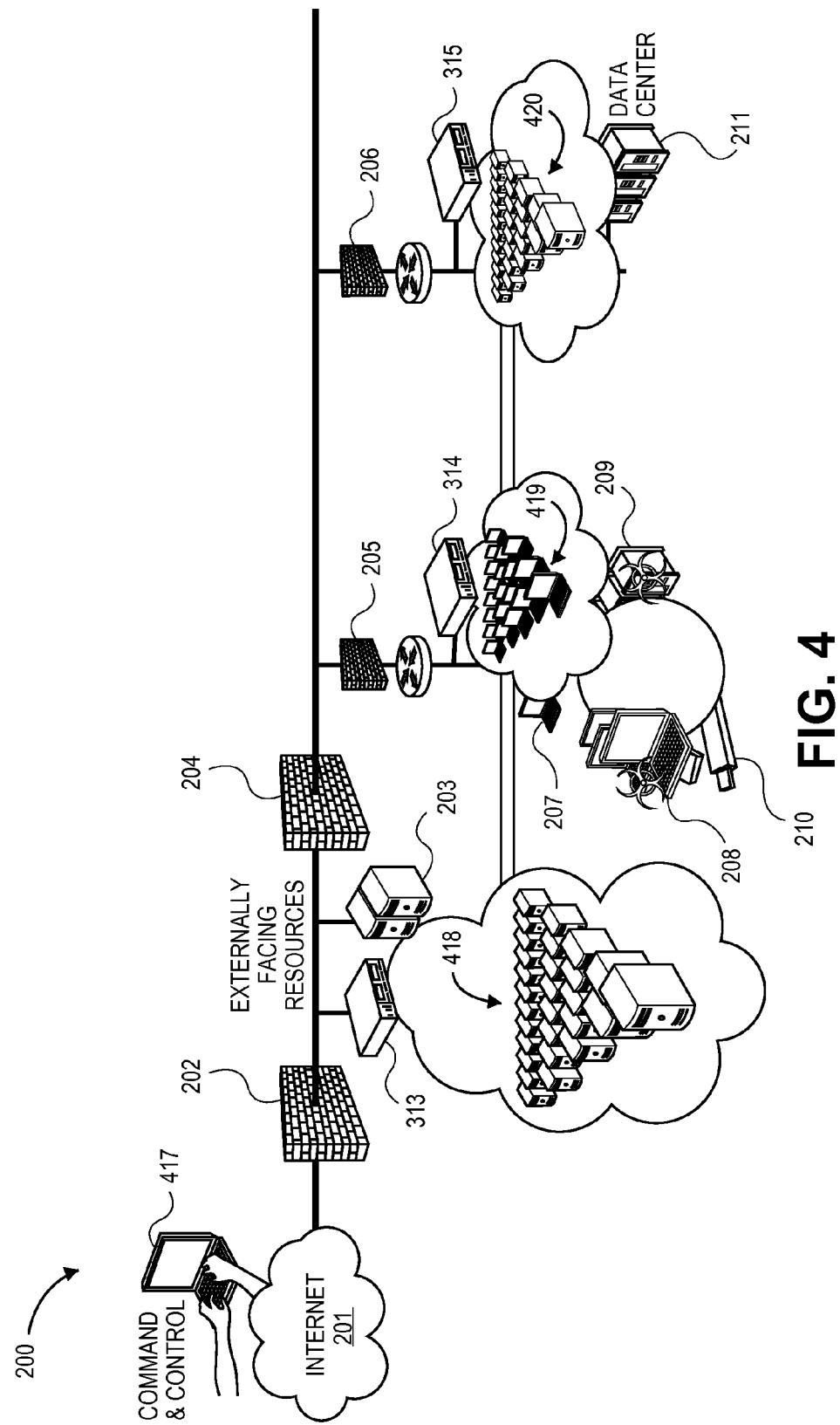
FIG. 4 illustrates point devices creating shadow networks of host emulators and connecting them to the networks of FIG. 3 in accordance with an embodiment.

FIG. 4 illustrates point devices creating shadow networks of host emulators and connecting them to the networks of FIG. 3 in accordance with an embodiment.

Network protection device 314 captures packets on the employee network and monitors them to ascertain a schedule of activations and deactivations of computer equipment at various times of the day. Over the course of a day, couple of days, week, month, and/or continuously, network protection device 314 refines a schedule of typical startup times and departures. Network protection device 314 also surveys the logical topology of the computer network, determining bus, star, ring, mesh, tree, hybrid, and daisy chain topologies of networks and subnetworks. It may also be programmed to determine where particular bottlenecks are in the system, what switches and routers create the bottlenecks, and other factors that affect how the topology may be seen from a hacker's point of view.

Network protection device 314 creates instances of (i.e., instantiates) and initializes hundreds of lightweight software-based host emulators 419. These low interaction host emulators take up little memory and bandwidth compared to other resources on the system. Using a common TCP/IP stack, each host emulator is programmed to respond at very simple levels to probing. Perhaps one of the simplest responses is to respond to an ICMP echo request packet. This response to a core protocol is recognized to exist across virtually all TCP/IP-enabled devices, from simple emulators to complex servers.

An IP address can be obtained for each host emulator from a DHCP server, from a table in the network protection device, or otherwise as known in the art. Based on the topology, network protection device 314 obtains IP addresses in the same subnet, e.g., 192.168.1.31 through 192.168.1.100.

Using the schedule determined from its monitoring, network protection device 314 connects host emulators 419 to the network in an interleaved fashion with the physical computers throughout the day. This creates a relatively difficult environment for a hacker because a hacker may not easily distinguish which computers are real and which are merely emulators.

A hacker may use a mapping program that sends swaths of these echo request packets across a network. If the number of host emulators exceed the number of physical computers by a significant factor, such as a factor of 5, then the hacker may believe that he hit the jackpot in discovering a huge computer network. In actuality, the network is ⅙th the size.

Similarly to network protection device 314, network protection devices 313 and 315 monitor their networks and interleave host emulators 418 and 420, respectively, with their networks.

Figure 5:
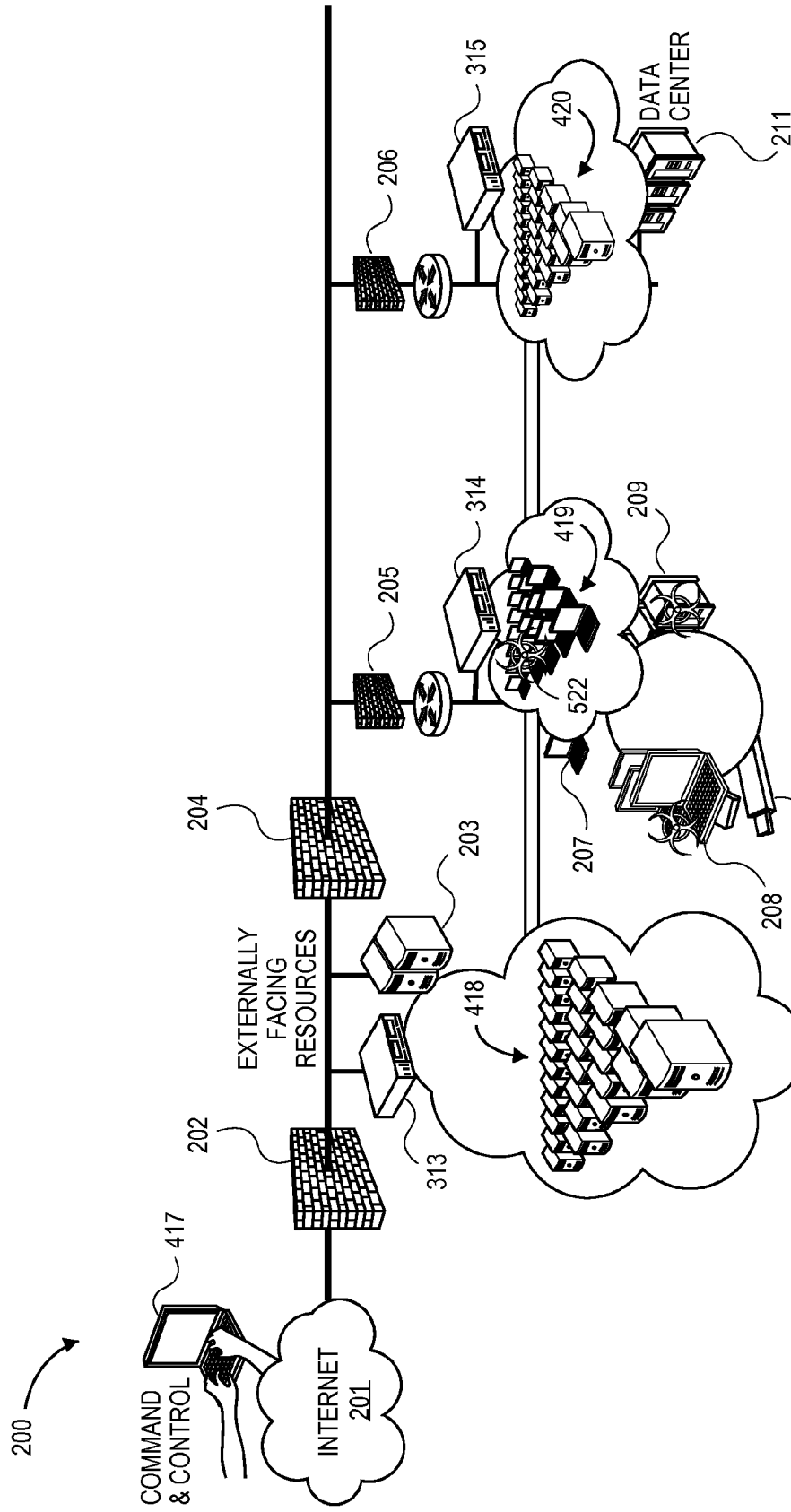
FIG. 5 illustrates a host emulator being infected from the infected server computer of FIG. 3.

FIG. 5 illustrates a host emulator being infected from the infected server computer of FIG. 3. The larger the number of host emulators, the greater the chance that a hacker will select a host emulator to probe or further infect. Given instructions from the hacker's command and control application 417, the hacker attempts to infect another computer on the network. Unfortunately for the hacker, and fortunately for the company, the hacker chooses host emulator 522 to attack. Network protection device 314, at 192.168.3.33, accepts the attack and allows the hacker to continue. In order to host the malicious code and accurately respond (as a real computer would) to the hacker's infection, host emulator 522 swaps itself out for a virtual machine that is on warm standby. That is, a virtual machine with the same operating system and patch level as a real, physical computer has on the network, gets host emulator 522's IP address at connection time by the hacker. This can occur immediately after a SYN-SYN-ACK handshake to begin a connection or later on upon more advanced communications with host emulator 522.

Figure 6:
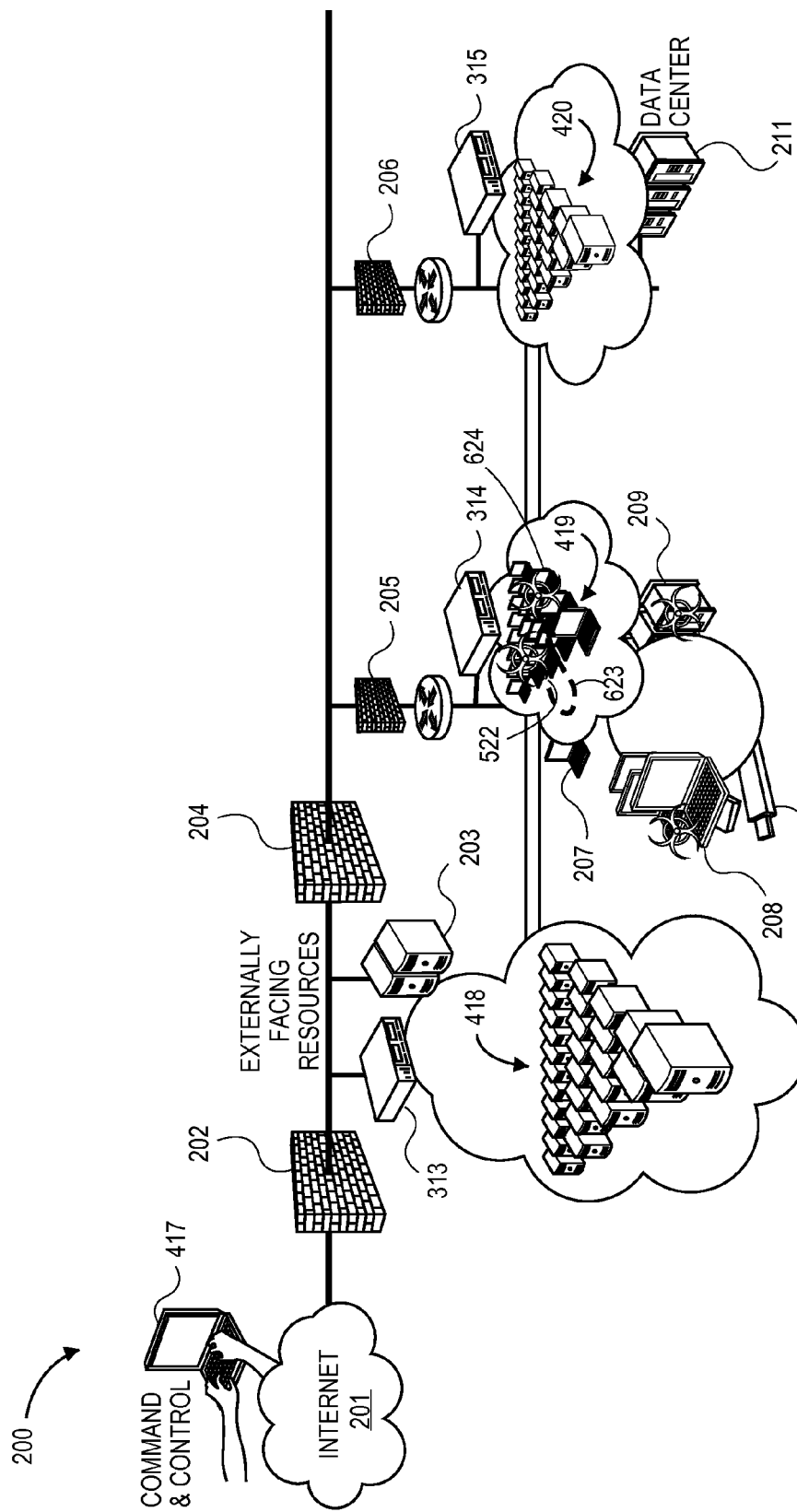
FIG. 6 illustrates containment of infections to other host emulators in accordance with an embodiment.

FIG. 6 illustrates containment of infections to other host emulators in accordance with an embodiment. A hacker attempts to further infections by attempting to connect with physical computer 207, which has the IP address 192.168.1.23. However, request 623 for connection is intercepted by network protection device 314. Network protection device 314 quickly spins up an alternative 192.168.1.23 IP address inside the shadow network and assigns it to a second host emulator 624. Using software defined networking, an IP conflict between physical computer 207 and host emulator 624 by routing all messages for 192.168.1.23 from the shadow network to host emulator 624. In this way, the real computer is protected from the hacker.

Figure 7:
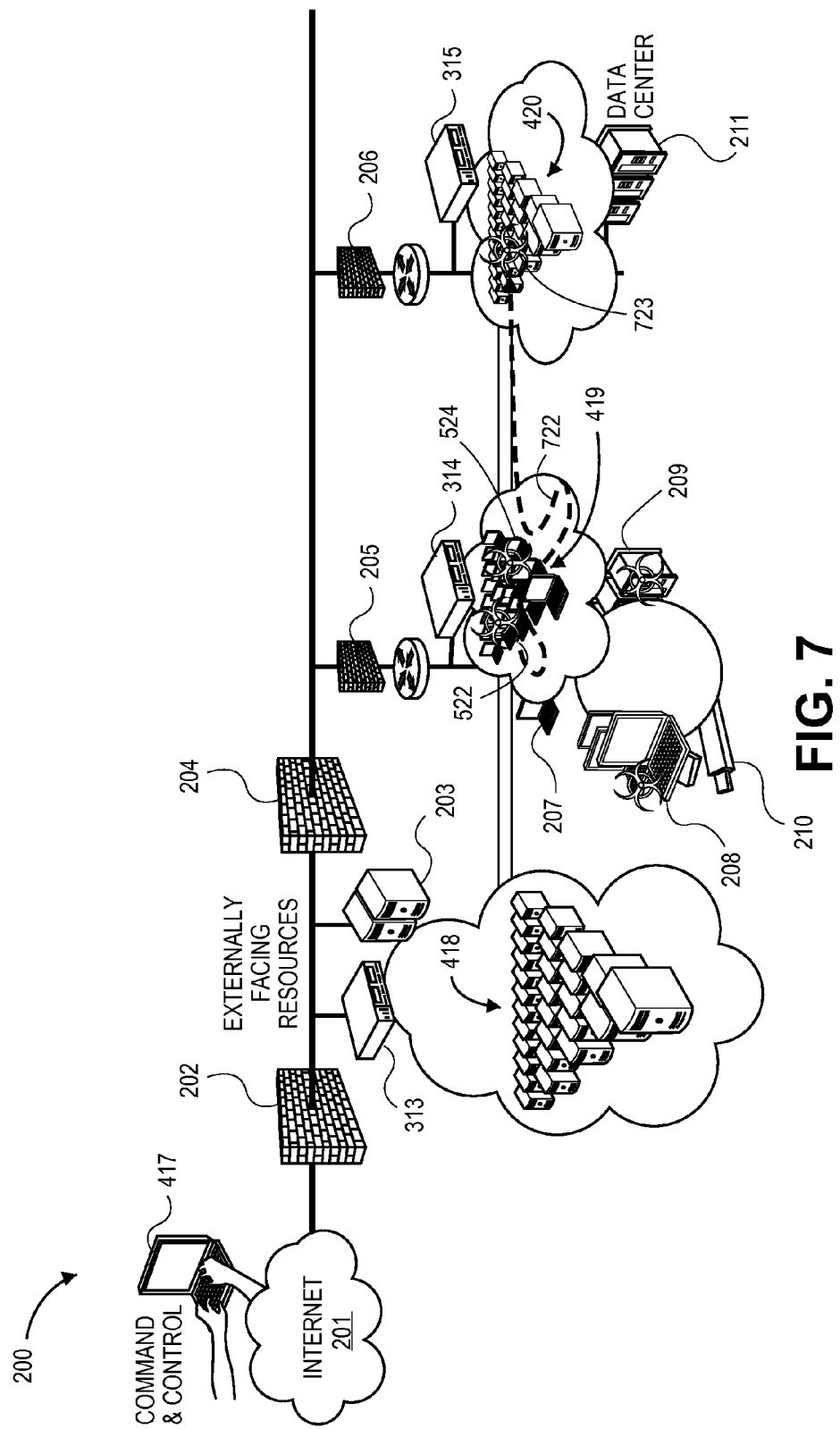
FIG. 7 illustrates containment of infections within a related shadow network in accordance with an embodiment.

FIG. 7 illustrates containment of infections within a related shadow network in accordance with an embodiment. In this case, the hacker attempts to infect data center server 211 from 'computer' 524. Data protection device 314 communicates this intention to data protection device 315, and data protection device 315 copies the IP address of data center server computer 211 to host emulator 723. Request for connection 722 from infected virtual machine 524 is then routed to host emulator 723, which may be replaced by a virtual machine. Software defined networking between network protection devices 314 and 315 keeps the IP addresses of the virtual, infected 'computers' from infecting the real, physical computers.

Figure 8:
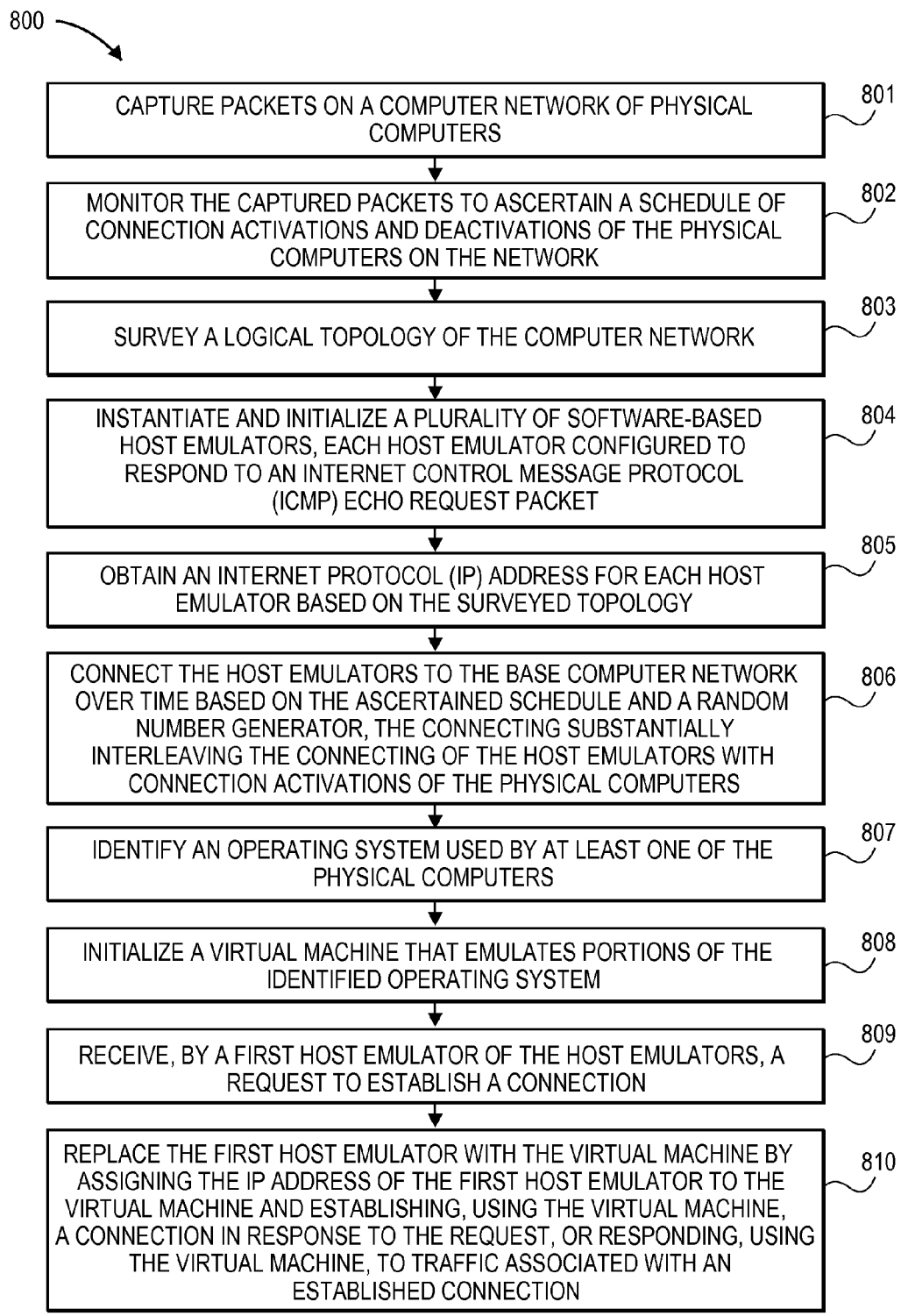
FIG. 8 is a flowchart of a process in accordance with an embodiment.

FIG. 8 is a flowchart of a process in accordance with an embodiment. Process 800 can be implemented wholly or partly in one or more computing devices. In operation 801, packets are captured on a computer network of physical computers. In operation 802, the captured packetes are monitored to ascertain a schedule of connection activations and deactivations of the physical computers on the network. In operation 803, a logical topoloty of the computer network is surveyed. In operation 804, a plurality of software-based host emulators is instantiated and initialized, each host emulator configured to respond to an Internet control message protocol (ICMP) echo request packet. In operation 805, an internet protocol (IP) address for each host emulator is obtained based on the surveyed topology. In operation 806, the host emulators are connected to the base computer network over time based on the ascertained schedule and a random number generator, the connecting substantially interleaving the connecting of the host emulators with connection activations of the physical computers.

In operation 807, an operating system used by at least one of the physical computers is identified. In operation 808, a virtual machine that emulates portions of the identified operating system is initialized. In operation 809, a first host emulator of the host emulators receives a request to establish a connection. In operation 810, the first host emulator is replaced with the virtual machine by assigning the IP address of the first host emulator to the virtual machine and establishing, using the virtual machine, a connection in response to the request. Alternatively, the replacement can use the virtual machine to respond to traffic associated with an already-established connection between the first host emulator and the requestor.

Figure 9:
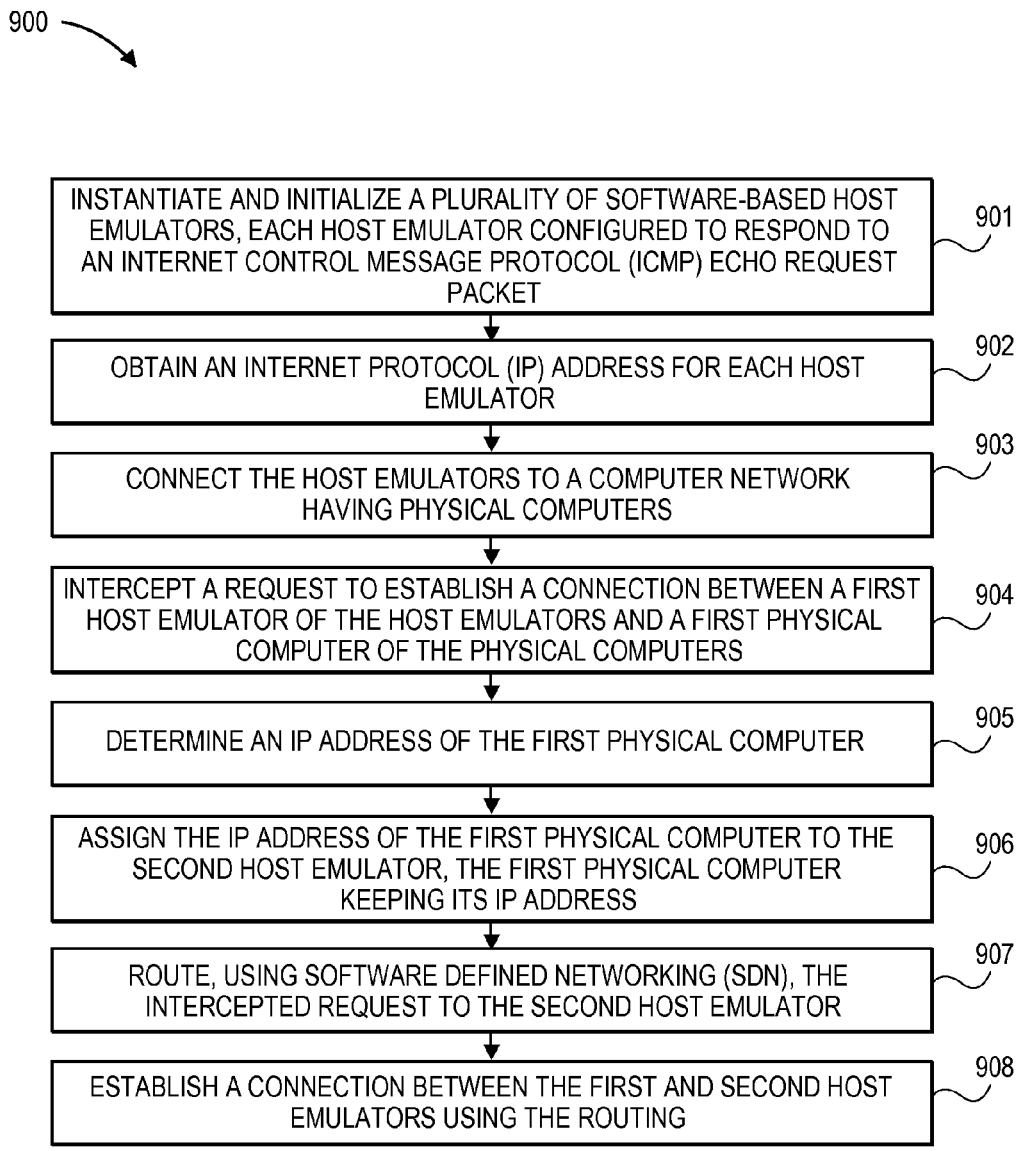
FIG. 9 is a flowchart of a process in accordance with an embodiment.

FIG. 9 is a flowchart of a process in accordance with an embodiment. Process 900 can be implemented wholly or partly in one or more computing devices. In operation 901, a plurality of software-based host emulators is instantiated and initialized, each host emulator configured to respond to an Internet control message protocol (ICMP) echo request packet. In operation 902, an Internet protocol (IP) address is obtained for each host emulator. In operation 903, the host emulators are connected to a computer network having physical computers. In operation 904, a request to establish a connection between a first host emulator of the host emulators and a first physical computer of the physical computers is intercepted. In operation 905, an IP address of the first physical computer is determined. In operation 906, the IP address of the first physical computer is assigned to the second host emulator, the first physical computer keeping its IP address. In operation 907, the intercepted request is routed, using software defined networking (SDN), to the second host emulator. In operation 908, a connection is established between the first and second host emulators using the routing.

Figure 10:
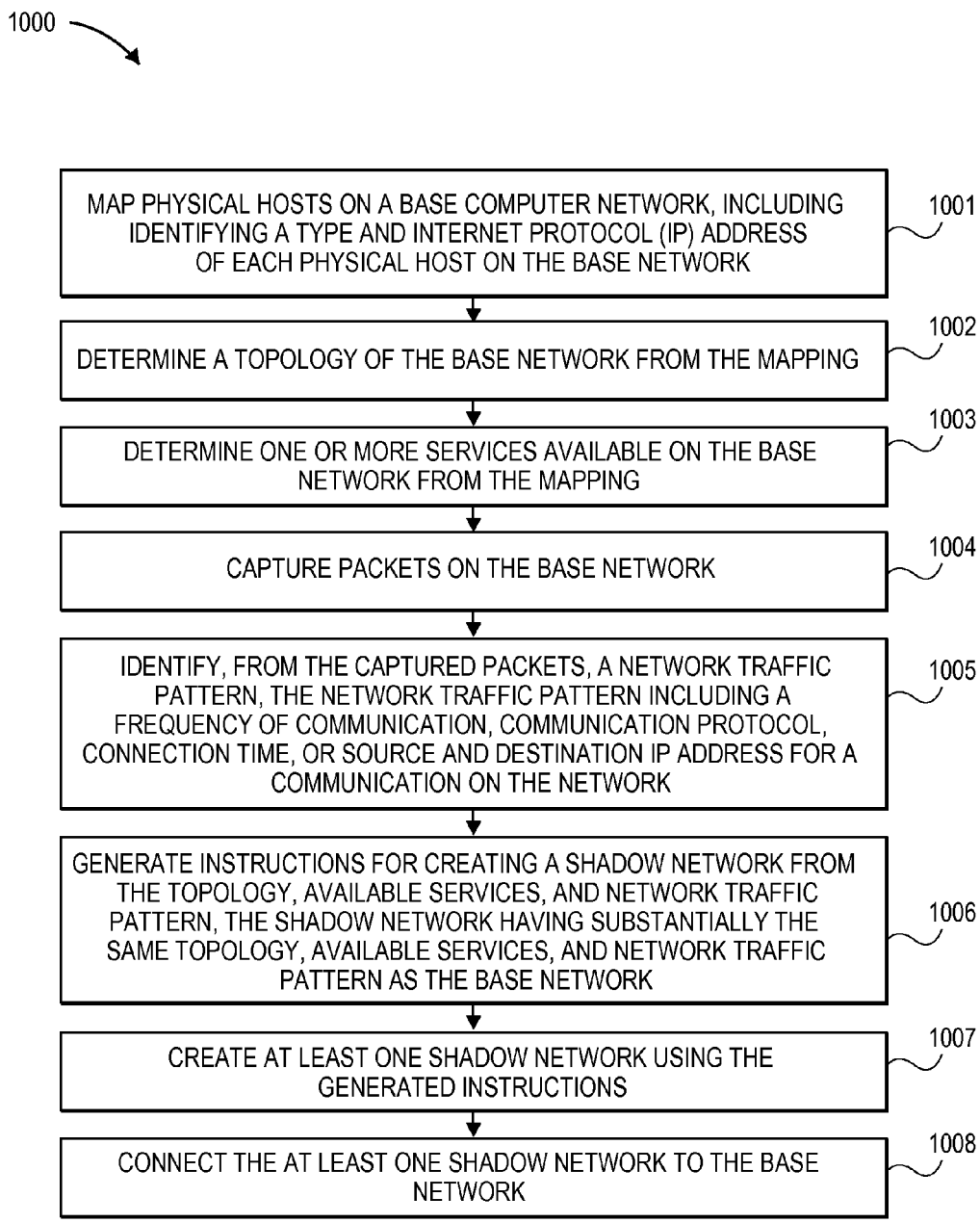
FIG. 10 is a flowchart of a process in accordance with an embodiment.

FIG. 10 is a flowchart of a process in accordance with an embodiment. Process 1000 can be implemented wholly or partly in one or more computing devices. In operation 1001, physical hosts on a base computer network are mapped, including identifying a type and Internet protocol (IP) address of each physical host on the base network. in operation 1002, a topology of the base network is determined from the mapping. In operation 1003, one or more services are determined to be available on the base network from the mapping. In operation 1004, packets are captured on the base network. In operation 1005, a network traffic pattern is identified from the captured packets, the network traffic pattern including a frequency of communication, communication protocol, connection time, or source and destination IP address for a communication on the network. In operation 1006, instructions are generated for creating a shadow network from the topology, available services, and network traffic pattern, the shadow network having substantially the same topoloty, available services, and network traffic pattern as the base network. In operation 1007, at least one shadow network is created using the generated instructions. In operation 1008, at least one shadow network is connected to the base network.

ALTERNATE EMBODIMENTS

Some alternate methods include steps such as:
1) Discovery of the base network
2) Creation of the instructions for reproducing the network
3) Reproducing the base network as one or more shadow networks
4) Interleaving the shadow network(s) with the base network, such that the entire interleaved network becomes an obfuscated network
5) Safeguarding the base network by detecting threats propagating from the base network and monitoring their behavior and limiting their propagation back to the base network and the Internet.
6) Identifying outgoing communications to the attacker's command and control and exfiltration servers and communicating the network egress details so that these communications can be blocked on the base network.
Steps 4, 5, and/or 6 may be executed by a network administrator.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of obfuscating physical computers on a computer network from hackers, the method comprising:
   capturing packets on a computer network of physical computers;
   monitoring the captured packets to ascertain a schedule of a plurality of connection activations and deactivations of the physical computers on the network;
   surveying a logical topology of the computer network;
   instantiating and initializing a plurality of software-based host emulators, each host emulator configured to respond to an Internet control message protocol (ICMP) echo request packet;
   obtaining an Internet protocol (IP) address for each host emulator based on the surveyed topology; and
   connecting the host emulators to the base computer network over time based on the ascertained schedule and a random number generator, the connecting substantially interleaving the connecting of the host emulators with the plurality of connection activations of the physical computers.

2. The method of claim 1 further comprising:
   identifying an operating system used by at least one of the physical computers;
   initializing a virtual machine that emulates portions of the identified operating system;
   receiving, by a first host emulator of the host emulators, a request to establish a connection;

replacing the first host emulator with the virtual machine by:
  assigning the IP address of the first host emulator to the virtual machine; and
  establishing, using the virtual machine, a connection in response to the request, or responding, using the virtual machine, to traffic associated with an established connection.

3. The method of claim 2 wherein the initializing of the virtual machine occurs before the receiving of the request to establish the connection, the virtual machine kept on warm standby until the replacing.

4. The method of claim 2 further comprising:
receiving, by a second host emulator, a second request to establish a second connection;
re-tasking the virtual machine by:
  assigning the IP address of the second host emulator to the virtual machine; and
  establishing, using the virtual machine, a connection in response to the second request, or responding, using the virtual machine, to traffic associated with a connection established by the second request.

5. The method of claim 2 wherein the initializing of the virtual machine occurs based on an alert received from a security product, a network communication anomaly, or an event triggered by a user-defined rule.

6. The method of claim 2 further comprising:
identifying a patch level of the operating system; and
initializing the virtual machine to emulate portions of the identified operating system in accordance with the identified patch level.

7. The method of claim 2 wherein the virtual machine is configured to emulate an operating system selected from the group consisting of a Microsoft Windows® operating system, Mac OS®, Linux® operating system, Unix operating system, iOS operating system, and Android® operating system.

8. The method of claim 2 wherein the virtual machine is configured to emulate an application executing on the operating system, the application being selected from the group consisting of a database server, a file server, and a web server.

9. The method of claim 1 wherein the IP address is obtained from a dynamic host configuration protocol (DHCP) server.

10. The method of claim 1 wherein each host emulator is configured to establish a connection using a SYN, SYN-ACK, and ACK handshake.

11. The method of claim 1 further comprising:
assigning a media access control (MAC) address to each host emulator, wherein each host emulator is configured to respond to an ICMP echo request packet with the assigned MAC address.

12. The method of claim 1 wherein a number of the host emulators exceeds a number of the physical computers by a factor of 5.

13. A method of containing a hacker within a shadow portion of a computer network, the method comprising:
instantiating and initializing a plurality of software-based host emulators, each host emulator configured to respond to an Internet control message protocol (ICMP) echo request packet;
obtaining an Internet protocol (IP) address for each host emulator;
connecting the host emulators to a computer network having physical computers;
intercepting a request to establish a connection between a first host emulator of the host emulators and a first physical computer of the physical computers;
determining an IP address of the first physical computer;
assigning the IP address of the first physical computer to a second host emulator, the first physical computer keeping its IP address;
routing, using software defined networking (SDN), the intercepted request to the second host emulator; and
establishing a connection between the first and second host emulators using the routing.

14. The method of claim 13 further comprising:
identifying an operating system used by at least one of the physical computers;
initializing a virtual machine that emulates portions of the identified operating system before the request is intercepted, wherein the virtual machine is on warm standby until the request is intercepted;
ascertaining that the identified operating system is the same as an operating system of the first physical computer; and
assigning the IP address of the first physical computer to the virtual machine.

15. The method of claim 14 further comprising:
identifying a patch level of the operating system; and
initializing the virtual machine to emulate portions of the identified operating system in accordance with the identified patch level.

16. The method of claim 13 further comprising:
providing host emulators on a second computer network having physical computers;
intercepting a second request to establish a connection between the second host emulator and a second physical computer on the second computer network;
determining an IP address of the second physical computer;
assigning the IP address of the second physical computer to a third host emulator of the second computer network, the second physical computer keeping its IP address;
routing, using SDN, the intercepted second request to the third host emulator; and
establishing a connection between the second and third host emulators.

17. The method of claim 13 further comprising:
capturing packets on the computer network of the physical computers;
monitoring the captured packets to ascertain a schedule of connection activations and deactivations of the physical computers; and
connecting the host emulators to the computer network over time based on the ascertained schedule and a random number generator, the connecting substantially interleaving the connecting of the host emulators with connection activations of the physical computers.

18. The method of claim 13 further comprising:
determining a media access control (MAC) address, host name, or workgroup name of the first physical computer; and
associating the second host emulator with the determined MAC address, host name, or workgroup name.

19. The method of claim 13 wherein the IP address is obtained from a dynamic host configuration protocol (DHCP) server.

20. A method of setting up a computer network to obfuscate hackers, the method comprising:
mapping physical hosts on a base computer network, including identifying a type and Internet protocol (IP) address of each physical host on the base network;
determining a topology of the base network from the mapping;

determining one or more services available on the base network from the mapping;

capturing packets on the base network;

identifying, from the captured packets, a network traffic pattern, the network traffic pattern including a frequency of communication, communication protocol, connection time, or source and destination IP address for a communication on the network;

generating instructions for creating a shadow network from the topology, available services, and network traffic pattern, the shadow network having substantially the same topology, available services, and network traffic pattern as the base network;

creating at least one shadow network using the generated instructions; and connecting the at least one shadow network to the base network.

\* \* \* \* \*